(No Model.)

F. A. MILLS.
WORK SUPPORTING AND FEEDING DEVICE FOR SHOE SEWING MACHINES.

No. 524,337.

Patented Aug. 14, 1894.

Witnesses
Edwin L. Bradford
Amy A. Johnson

Inventor
Francis Arthur Mills.
By Johnson & Johnson
his Attorneys (No Model.) 9 Sheets—Sheet 2.

F. A. MILLS.
WORK SUPPORTING AND FEEDING DEVICE FOR SHOE SEWING MACHINES.

No. 524,337. Patented Aug. 14, 1894.

Witnesses
Edwin L Bradford
Amy Johnson

Inventor
Francis Arthur Mills.
By Johnson & Johnson
His Attorneys.

(No Model.)  9 Sheets—Sheet 4.

F. A. MILLS.
WORK SUPPORTING AND FEEDING DEVICE FOR SHOE SEWING MACHINES.

No. 524,337. Patented Aug. 14, 1894.

(No Model.) 9 Sheets—Sheet 6.

F. A. MILLS.

WORK SUPPORTING AND FEEDING DEVICE FOR SHOE SEWING MACHINES.

No. 524,337. Patented Aug. 14, 1894.

(No Model.) 9 Sheets—Sheet 7.
F. A. MILLS.
WORK SUPPORTING AND FEEDING DEVICE FOR SHOE SEWING MACHINES.
No. 524,337. Patented Aug. 14, 1894.

Witnesses:
Wm A. Schoenborn.
Urey A. Johnson

Inventor:
Francis Arthur Mills.
By Johnson & Johnson
his Attorneys.

(No Model.) 9 Sheets—Sheet 8.

F. A. MILLS.
WORK SUPPORTING AND FEEDING DEVICE FOR SHOE SEWING MACHINES.

No. 524,337. Patented Aug. 14, 1894.

Witnesses
Edwin L Bradford

Inventor
Francis Arthur Mills
By
Johnson & Johnson
his Attorneys

(No Model.) 9 Sheets—Sheet 9.

F. A. MILLS.
WORK SUPPORTING AND FEEDING DEVICE FOR SHOE SEWING MACHINES.

No. 524,337. Patented Aug. 14, 1894.

Witnesses
Edwin L Bradford
Chay D Johnson

Inventor
Francis Arthur Mills.
By Johnson & Johnson
his Attorneys

UNITED STATES PATENT OFFICE.

FRANCIS ARTHUR MILLS, OF PHILADELPHIA, PENNSYLVANIA, ASSIGNOR, BY MESNE ASSIGNMENTS, OF ONE-HALF TO JAMES MUNDELL, OF SAME PLACE.

WORK SUPPORTING AND FEEDING DEVICE FOR SHOE-SEWING MACHINES.

SPECIFICATION forming part of Letters Patent No. 524,337, dated August 14, 1894.

Application filed January 28, 1893. Renewed November 16, 1893. Serial No. 491,160. (No model.)

*To all whom it may concern:*

Be it known that I, FRANCIS ARTHUR MILLS, a citizen of the United States, and a resident of the city of Philadelphia, in the county of Philadelphia and State of Pennsylvania, have invented certain new and useful Improvements in Work Supporting and Feeding Mechanism for Shoe-Sewing Machines, of which the following is a specification.

The invention herein is directed to improvements in devices for supporting and feeding the work in machines for sewing boots and shoes, wherein a curved barbed needle operates with a waxed thread; and my said invention consists in certain novel parts and combinations of parts hereinafter specifically set forth in the claims concluding this specification. Before specifying such claims I will describe the machine illustrated in the drawings.

The following description read in connection with the drawings will enable any one skilled in the art to which my invention relates to understand its nature and to practice it in the form in which I prefer to employ it; but it will be understood that my invention is not limited to the precise form herein illustrated and described, as various modifications may be made without departing from its spirit and without exceeding the scope of the concluding claims.

Referring to the drawings.

The machine may be mounted upon any suitable supporting structure or standard in position for the presentation and manipulation of the work to the sewing, supporting and feeding devices. The structure which contains the sewing, work supporting, and feeding mechanisms comprises a horizontal base-plate 1, a centerhead mounted thereon at right angles and forming a front and a rear pillar 3 and 3' connected by a semi-circular wall 4, making an inverted arch open at its base or top and at each side for the accommodation of separate cylinders having cams for operating the sewing and the work supporting mechanism and for the arrangement of the crank connected pitman rod for operating the needle carrier, the crank-pin whereof unites the said cylinders. This centerhead contains a separate nose-part which I call the sewing-head mounted upon and overhanging the front pillar 3 for containing the sewing mechanism proper.

Figures 1, 9, 10, 11:
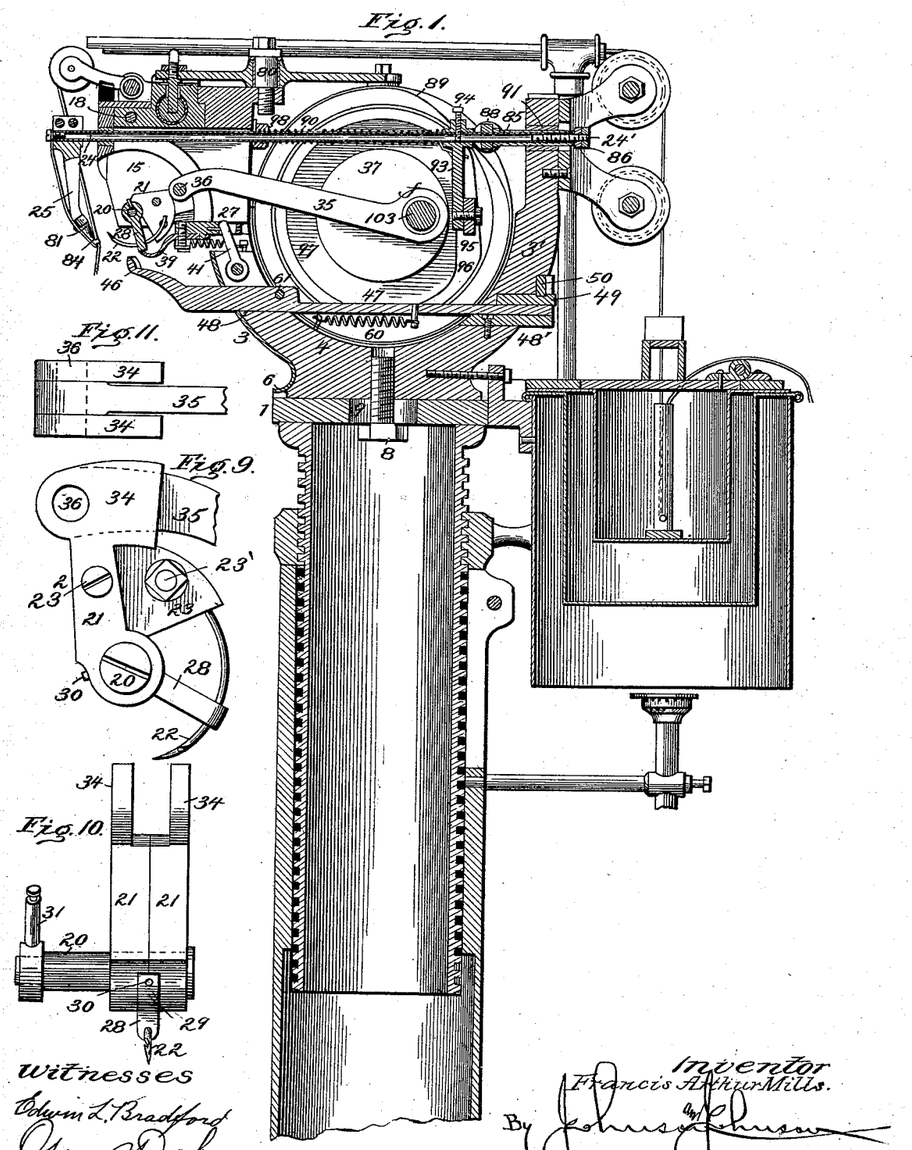
Figure 1 represents a vertical central section of a shoe sewing machine embodying my inventions, the needle being shown in the position it occupies in its full outward movement, and the supporting devices locked in positions to support the work as the loop is pulled and the stitch set.
Fig. 9 (Sheet 1) shows the needle-carrier in side view.
Fig. 10 is a front view of the same.
Fig. 11 a top view of the same, showing the end of its operating pitman-rod and the cheeks for the pivot bearing thereof.
Figure 4:
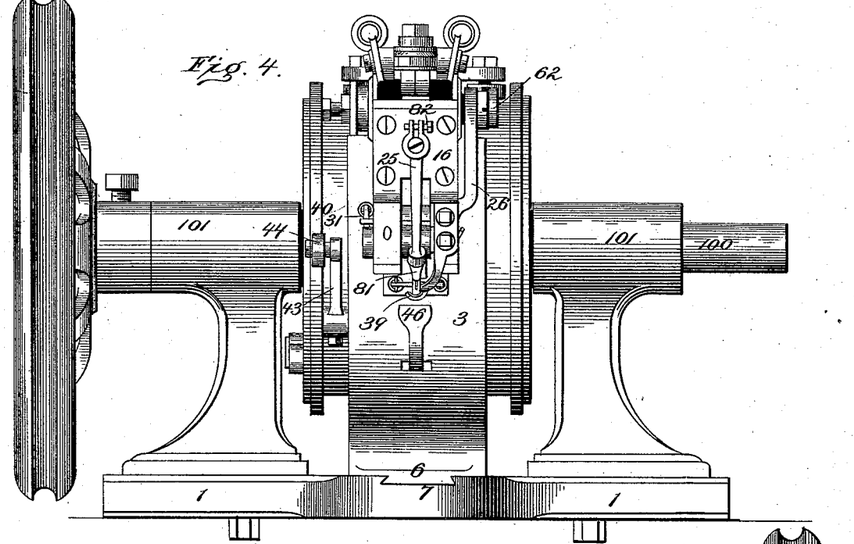
Fig. 4 is a front view of the same.
Figure 5:
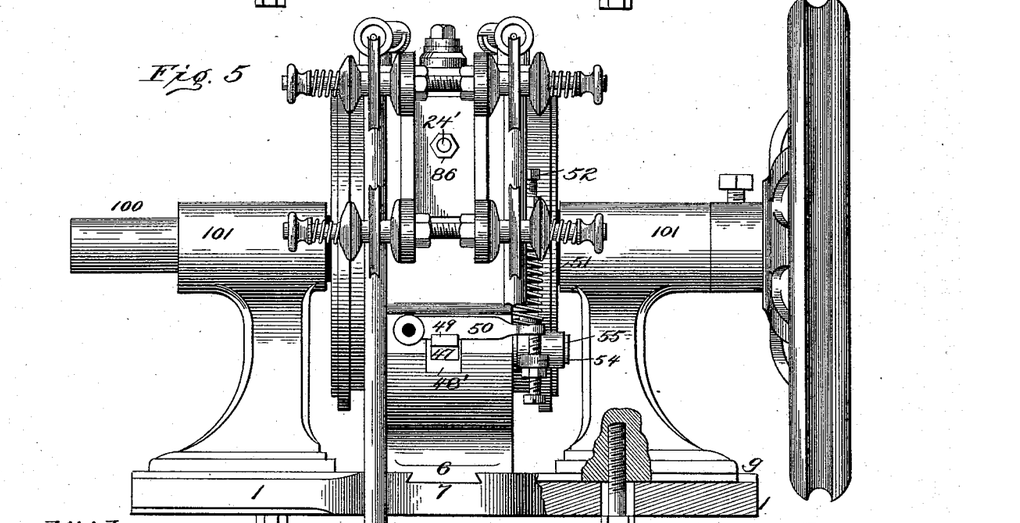
Fig. 5 is a rear view of the same.

The center-head is firmly secured upon the base plate by means of a bottom dovetail tongue 6 fitting in a corresponding groove 7, Figs. 4 and 5, on the upper side of the base-plate and a center-bolt 8 passing through a transverse slot 9, Fig. 1, in the said base-plate into the solid base of the centerhead whereby the centerhead can be adjusted in relation to the crank operating pin of the needle carrier, to give the needle more or less frontward position with respect to the looper to give the proper relation of the needle's barb thereto. The front pillar 3 of the center head has a rectangular vertical opening 10 open at the top within which is mounted the sewing-head, which, for this purpose has vertical co-incident recesses 11, 11, on each side fitting corresponding tongues 12, 12, on the inner walls of the opening 10 in the centerhead Figs. 17 and 18 and when seated in place within the latter is secured by screw bolts 13 passing through the vertical sides of the centerhead and into threaded holes 14 in the sides of the sewing head. This sewing-head is constructed of vertical side plates 15 secured together so as to leave an intervening space by a front plate 16 and a top plate 17 fastened together by a cross screw 18.

Figure 2:
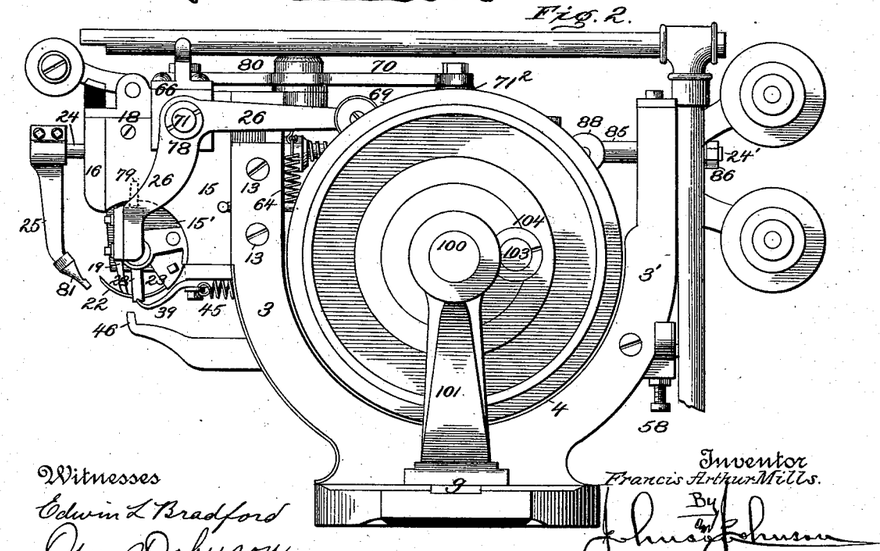
Fig. 2 is an elevation of the right side of the machine.
Figures 12, 13, 14:
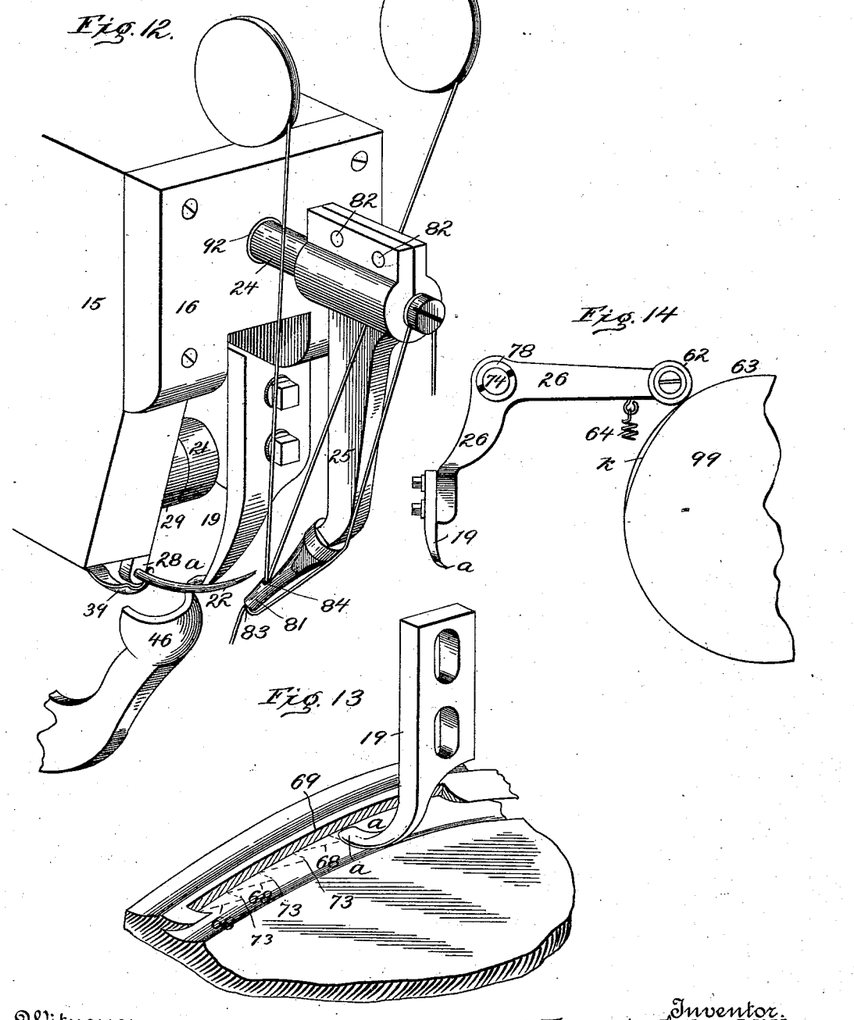
Fig. 12 (Sheet 6) shows in perspective a portion of the sewing-head and the work supporting, looper and feeding devices thereof.
Fig. 13 shows the feed-lever arm in its relation to the shoe channel, illustrating in dotted lines the oblique movements of the feed lip.
Fig. 14 shows the feed-lever and its operating cam.
Figure 17:
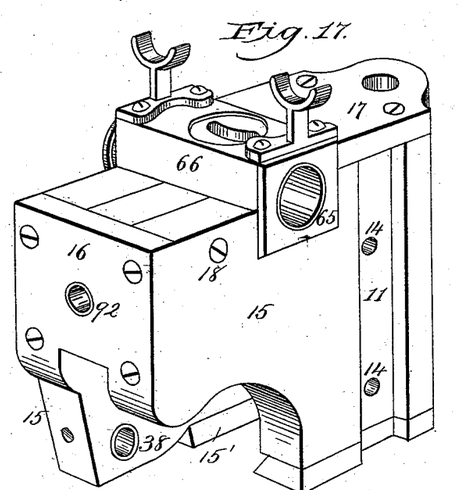
Fig. 17 shows the sewing-head structure divested of its operating devices.
Figure 18:
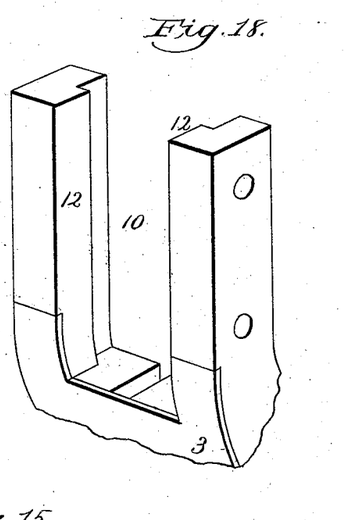
Fig. 18 shows the bifurcated front pillar of the centerhead wherein the sewing-head is secured.

The right vertical side plate is arched at its lower front corner to leave an open space 15', within which the acting end 19 of the feed-lever works at the side of the head, Figs. 2, 12 and 17, and which opening allows access to the needle-carrier. In the other vertical side plate the needle-carrier is loosely mounted upon a horizontal rocking pin 20, Fig. 10 (Sheet 1). This carrier is formed of two matching plates 21, 21, to the inner side wall of one of which the curved needle 22 is clamped by a cap 23, so as to extend to the front from the lower side of the carrier, which latter is arranged to operate between the sewing-head plates at the arched opening 15' at the side thereof as seen in Figs. 2 and 12.

The parts which form the needle-carrier are each recessed on their meeting faces at each end, so that when secured by the screw 23² together, these recesses form forks or bifurcations as seen in Fig. 10, to receive the pitman-rod and the needle-guide arm. The cap 23 is secured to one of the carrier parts by the screw-pin 23' and clamp nut, the needle passing through a diameter hole in the screw-pin and fitting in grooves in the meeting faces of the clamping parts in the usual way.

Figures 19, 24:
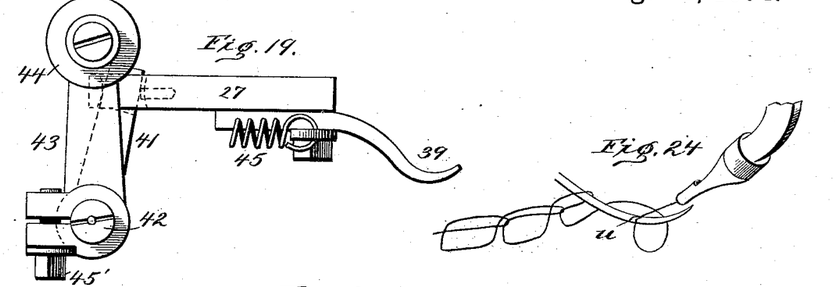
Fig. 19 is a side view of the back-gage device.
Fig. 24 shows the thread as it is placed in the needle-barb in the operation of forming the loop stitch.

Above the needle-carrier, the rod 24 which carries the looper 25, passes through and has a bushed bearing 92 in the front plate 16 of the sewing-head. Above this looper-rod at the right side of the sewing-head, is mounted the actuating lever 26 of the feed-device; while back of and below the needle-carrier, the back gage slide 27 is fitted within the slotted bottom of the sewing-head, Fig. 19.

I make the needle-carrier of two plates to obtain a convenient construction for the mounting of the needle-guide 28 between them upon the pivot pin 20 of said carrier, upon which said needle guide is fixed, while the needle-carrier is loosely mounted on said pin, so that the carrier and the needle-guide will operate together and also independently of each other. For this purpose there is a space between the pivot bearing ends of the matching plates 21, 21, to receive the eyed end 29 of the needle guide-arm 28, which is pinned to the pivot by a pin 30, Figs. 9 and 10, which projects so as to be struck by the needle-carrier when the top of the latter moves forward to give an inward movement to the needle-guide to follow the needle back in its function of bracing and guiding it.

Figure 3:
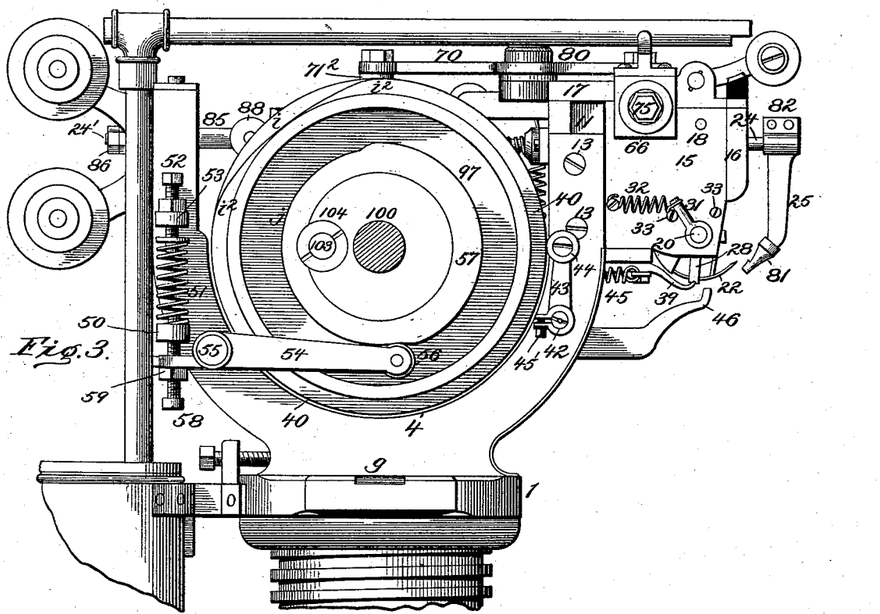
Fig. 3 is an elevation of the left side of the machine.

For keeping the needle-guide in proper relation to the barb of the needle, I fix an arm 31, Figs. 3 and 10, on the outer end of the pivot-pin 20 of the needle-carrier and connect said arm to a spring 32 which constantly tends to pull it back and the needle-guide forward so that as the needle-carrier moves forward the guide-arm will be free to move forward with it.

Stop pins 33, Fig. 3, on the outer wall of the left plate of the sewing-head, act to limit the movement of the arm 31 and the needle-guide in proper relation to the barb of the needle.

The needle-carrier has cheeks 34, Figs 9 and 11, between which the crank operated pitman 35 is connected by the pin 36. These cheeks are fitted to move closely between the inner walls of the side plates 15 of the sewing-head and the latter thereby serve as guides for supporting the upper end of the needle-carrier to prevent sidewise looseness in its motion, prevent undue strain upon the pivot 20 of said carrier, and gives a firm movement to the needle in piercing the work. These cheeks also give a firm sidewise support to the connecting pitman-rod and cause it to have a direct central pull in the line of the needle; while the crank-pin connected end of the pitman is firmly supported sidewise between the hubs 37, Fig. 7, of cam cylinders to which the crank-pin is fastened. This construction gives a direct, firm and easy movement to the pitman-rod and to the needle-carrier, renders them durable, easily put in place, and allows a renewal of the bearing of the carrier-pivot 20 by a bushing 38, Figs. 17 and 25, fitted in the sewing-head.

For supporting the edge of the sole at the point of stitching and clear of the point of the needle when feeding the work, I provide a back gage 39 carried by the slide 27 dovetailed in the bottom plate of the sewing-head. The back gage is driven forward by a cam 40, Figs. 3 and 6, in position to support the edge of the sole just before the needle moves forward to pierce the work. The slide 27 is slotted and is loosely connected by an arm 41, Fig. 20 standing up from a cross pin 42 having a solid bearing in the centerhead and having an arm 43 on its outer end at the left side of the centerhead provided with a friction roll 44, which is actuated by the cam 40 to effect the positive forward movement and locking of the back-gage. The inward movement of the back-gage is effected by a spring or springs 45 connected to the slide and the centerhead. This positive forward movement of the back-gage is important because it serves to lock the gage when so moved so that the upper of the work can be held firmly against the shoulder of the sole, and the tension of the thread does not have to pull the upper against the shoulder. In sewing machines of this type so far as I know and can find this locking function of the back-gage has been effected by the uncertain action of a spring and pawls, such uncertainty being due to the non-positive force of the spring and pawls and the quick action of the needle, which is thereby constantly liable to move in advance of the back-gage. When this occurs the needle will pierce too low into the upper to allow the latter to be drawn to the shoulder of the sole and this draws the upper in the shanks of the shoe so as to prevent a smooth setting and makes the shanks more or less irregular, because it requires a much greater tension of the thread in drawing the upper in the opposite side. Whereas by giving the back-gage a positive forward movement and a firm lock when so moved, it will always put the upper to its place before the needle pierces the upper, and hence the tension is made uniform and there is no unequal drawing of the upper at the shanks. This is particularly advantageous in sewing welted shoes. I provide for adjusting the back-gage so as to limit its distance from the feed lips to suit the thickness of the material between the bottom of the channel and the edge of the sole, and for giving a suitable clearance for the feed of the shoe, between the feed device and the back-gage when the shoe is being fed. This adjustment is made by setting the cam actuated arm 43, so that it will act to carry the back-gage more or less forward, and this is attained by a clamp screw 45′, Fig. 19, passing through a split in the bearing end of said arm 43 so that the latter can be clamped on the cross-pin 42 which actuates the slide 27.

Figure 20:
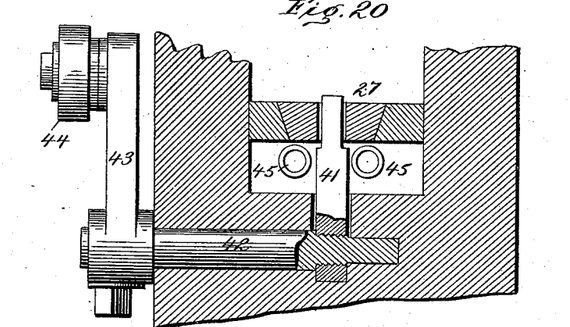
Fig. 20 is a vertical section of the device for operating the back-gage.

The slide connected arm 41, Fig. 20, is screwed upon the pivot-pin 42 against a shoulder which makes a convenient joining in the solid metal of the centerhead which has a deep recess to receive the arm 41 and through which recess the said pin passes.

While I have stated that the back-gage is locked by the cam 40 in position to support the work I mean that the cam operates to push the gage forward by a positive force and hold it. Such pushing action is made quick in its first movement and slowly as it comes in contact with the work so as not to jar or knock the shoe, as would be the case by the sudden action of a spring and which is always liable to force the feed-lip through the between substance. This quick and slow movement of the back-gage is effected by the form of the cam as seen at $i$, $i^2$, $i^3$, in Fig. 3.

For supporting the lasted shoe in proper position to the sewing mechanism, I provide a slide-rest arranged below the back-gage and co-operating with it. Its acting end 46 stands vertically with a convex outer face just under the acting end of the back-gage and curving downward and rearward terminates in a flat bar 47, Figs. 8 and 21, which is fitted to slide horizontally in guide ways 48, 48′ in the front and in the rear pillars of the centerhead, and in line with the line of movement of the needle-guide, so that the line of pressure upon it is direct. Its front guide way is preferably of an inverted T-shape, while the guide way for its inner end is formed in box 48′ fixed in the centerhead and open at its ends and top.

Figure 22:
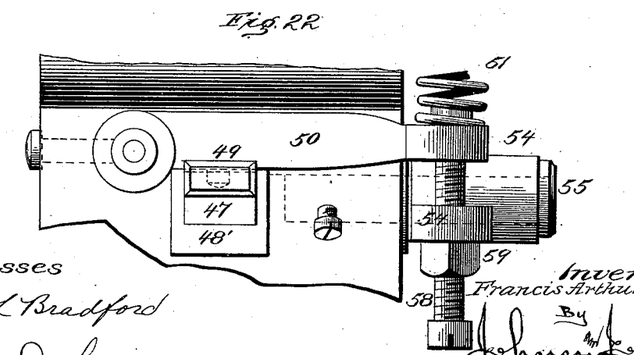
Fig. 22 shows in elevation the locking-device for the slide-rest.

A friction clamp-block 49 is fitted to have a vertical movement within this box so as to act with a clamping and releasing function upon the flat end of the slide rest 47 to lock it in a fixed relation to the centerhead, when the needle draws the stitching inward so as to hold the slide-rest firm while the stitches are being drawn tight. This clamp-block is held in position upon the slide-rest by a pressure-lever 50 pivoted to the rear side of the centerhead at one side of the box, and crossing over the friction-block engages a cross-groove, Figs. 1, 8 and 22, therein so as to prevent the block moving with the slide-rest. The other end of this pressure-lever extends beyond the left side of the centerhead and is constantly forced down by a spring 51 connected to the centerhead and adjusted to give the proper degree of pressure upon the lever 50 necessary to bind and lock the slide rest. This adjustment is made by a tension screw 52, Fig. 3, fitted in a fixed lug 53 at the top of the spring. To release the lock on the slide-rest, I provide a lever 54 pivoted at 55 to the left side of the centerhead at a point just at one side of and below the free end of the pressure-lever. This lever 54 extends frontward and has a friction roll 56 which engages a side face-cam 57, which is formed to both lock and release the slide-rest lever 50, as I shall presently state. The arrangement of the pivot 55 of this cam actuated lever 54 places the short end of said lever just under the free end of the pressure-lever 50, so as to lift the latter by a screw 58 in the short end of said cam actuated lever, abutting against the underside of the free end of the pressure-lever and thus when lifting the latter, release the pressure of the friction block 49, on the slide rest and leave it free to be pushed back with the work. This screw 58 has a jam-nut 59 by which the bearing relation of the meeting ends of the two levers 50 and 54 can be adjusted to constantly maintain the contact of the pressure-lever upon the cam-lever and the latter in contact with its actuating cam 57 and thus prevent lost motion.

Figure 8:
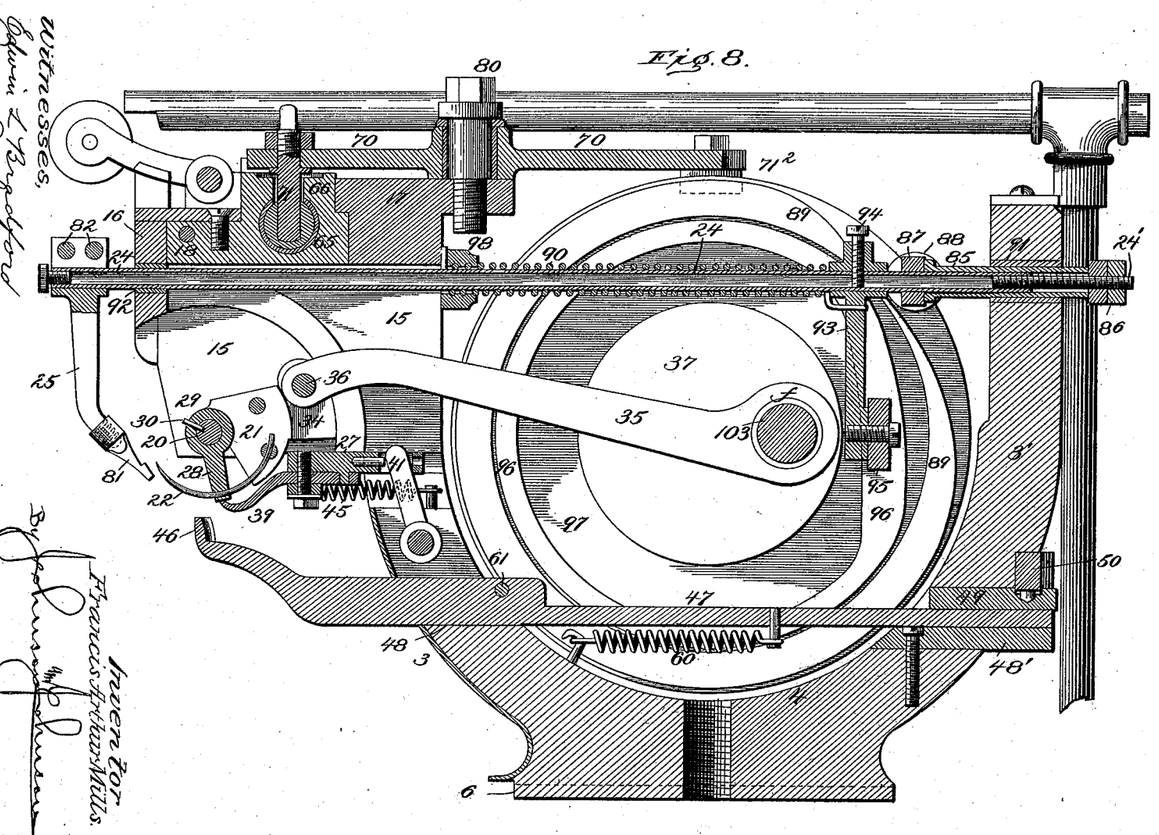
Fig. 8 shows an enlarged vertical section of the centerhead structure, the several devices contained therein occupying the positions shown in Fig. 1.
Figure 21:
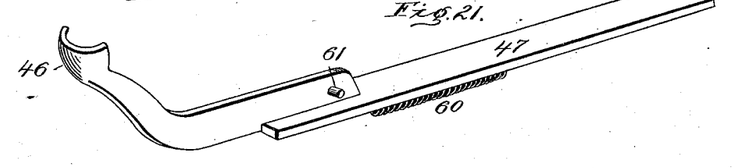
Fig. 21 shows the slide-rest.

The guide-box 48' is fitted and secured in a recess in the centerhead, and the slide-rest is constantly pressed forward by a spring 60, Figs. 8 and 21 which allows it to yield when the shoe is being fed. The outward movement of the slide-rest is limited by a pin 61 therein abutting against the inner wall of the centerhead.

The compound lever device for locking the slide-rest is such as to allow the cam actuated lever 54 to be constantly engaged with its cam and independent of the locking function of the pressure-lever. This allows the latter to be lifted by a free and easy movement of the cam-lever, because the latter has a very short lifting leverage and acts upon the free end of the pressure-lever in a vertical line with the tension spring. This arrangement of the said levers and spring gives the advantage of placing the friction-block near the pivot end of the pressure-lever, and thus obtain great pressure by a comparatively light spring.

The device for feeding the shoe as seen in Figs. 2, 13, 14, 15 and 16, consists of a lever 26 approximately L-shaped pivoted to the right side of the sewing-head at its top and carrying at its lower end an arm 19 which terminates in a lip $a$ standing toward the machine and adapted to enter the channel of the sole. The upper end of this lever has a friction roll 62 which is held down upon a circumferential cam 63 of a cam cylinder by a spring 64, Fig. 2, connected to the centerhead. The pivot bearing of this lever is fixed to it, is of considerable diameter, and is fitted in a bushed bearing 65, in a box 66, Fig. 8, which is seated and secured between and within rectangular depressions in the top edges of the side plates 15 of the sewing-head, by the screw 18, which binds said plates and by the cap plate 17 on the other side of said box. The intermittent rocking motion of this feed-lever imparts outward and inward movements to its feeding or lipped end. Simultaneously with the outward movement, the feed-lever has imparted to it a lateral or sidewise movement upon its pivot-pin, which, for that purpose slides in its box, so that the two movements will describe a zig-zag path 68 like that of saw teeth, as illustrated in Fig. 13. This oblique feed of the lip is outward from the bottom of the channel toward the right. At the end of this oblique movement which is indicated by the dotted line 68, the inward movement of the feed lip is effected to cause it to engage the bottom of the channel 69, and after the stitch has been thoroughly pulled the said lever is then caused to move back sidewise carrying its pivot-pin in its box, and thus moving the feed-lip to the left to feed the shoe for the next stitch. For effecting these lateral movements of the feed lever I provide a mechanism which consists of a lever 70 pivoted to the top plate of the sewing-head in the rear of the laterally sliding pin of the feed-lever and connected at its front end to said sliding pin, by a vertical pin 71, Fig. 16, which fits into a hole in said sliding pin. As this pin is fixed to the feed-lever and has a rocking motion with it this hole is larger than the vertical pin 71 to accommodate said rocking movement. The two arms of this lever 70 have each a friction roll $71^2$ which engage vertical face cams 72, 72, Figs. 6, 7, and 15, arranged on the separate cam cylinders and which impart a horizontal vibratory movement to said lever 70, which thereby gives a sidewise movement of the pivot-pin 74 in its box 66 to move the lever 26 sidewise as stated. This compound movement of the feed device is such that each complete movement of the feed-lever and its return movement for the next feed, describes an acute angle, the apex 73 of which is the point at which the feed-stroke terminates as will be understood from Fig. 13. It is from this point 73 that the feed-lip describes its oblique path 68 to the point at which the said lip stops to make the short inward movement to the point from which it describes the base line of a right angle triangle, and this so far as I know and can find is a new and advantageous movement for a channel-feed.

The provision for two rolls and two cams for operating the lever 70 which gives the lateral movements to the channel lip $a$ of the feed device, is important for operating said lever without lost motion, and thus keep the channel-lip always free of the path of the needle, and cause the feed-lip to act with precision in the channel. It is important also to observe that the oblique movement of the feed-lip gives a more gradual action to open the channel, freeing the lip completely from the bottom of the channel, while making its return movement for the next feed and thus avoids much trouble which attends replacing the lip in the channel. It also gives the advantage of sewing in channels of little depth and thin lips.

Another important advantage of the saw-tooth feed is that it gives a gradual instead of a sudden withdrawal movement of the feed-lip from the bottom of the channel and therefore the lip is not so liable to jump out of the channel, as is frequently the case in the feed device now in use and in which the line of stitching is in a path of right-angles. The oblique withdrawal feed movement also gives an easy wave-like movement to the feed lever-lip, so that its operating cam does not cause a quick outward jumping movement of the feed-lever. Such oblique movement also prevents the feed-lip from cutting through the between substance of the sole in the channel on the inward movement of the feed-lever; and it prevents the undue wear of the cam that actuates the feed-lever.

Figures 15, 16:
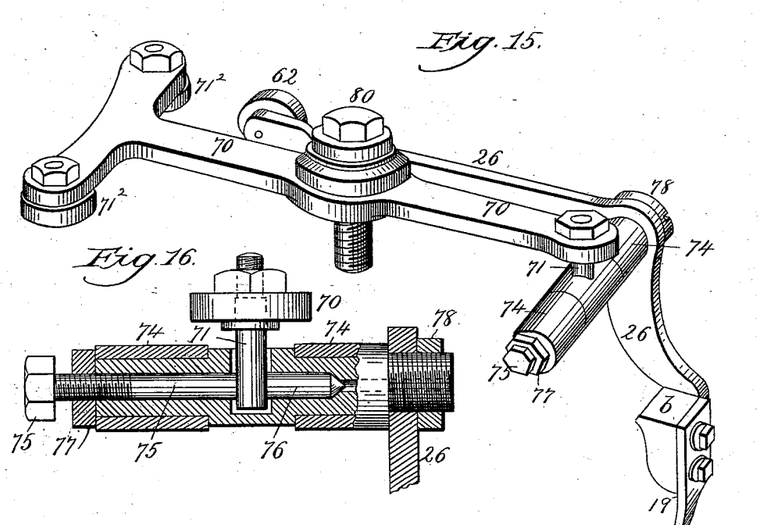
Fig. 15 shows the compound feed-lever device.
Fig. 16 is a sectional view of the pivot bearing of the feed-lever device.

I make the lateral sliding pivot-pin, Figs. 8, 15 and 16, of the feed lever 26, about three inches long and seven-eighths of an inch in diameter to give a sufficient bearing for the firm seating of the lever, and it may be constructed with steel bearing sleeves 74 fitted on each end so as to be renewed when worn. I may also provide this sliding pivot-pin with a central bore intersecting the side hole which receives the pin 71 of the top lever 70, and I place in this bore steel bearing pins 75 and 76 on each side of the pin 71 of said top lever. I make one of these bearing pins 75 in the form of a screw so that its adjustment against the said top lever pin 71 will take up any wear, and in this way the feed-lever can be maintained cheaply in perfect working fit.

The adjusting screw has a jam nut 77 which binds the sleeve and screw in place; while a nut 78 on the other end of the sliding pivot-pin serves to secure the feed-lever and bind the sleeve so that these two sleeves 74 form fixed parts of the pivot-pin.

Figures 25, 26:
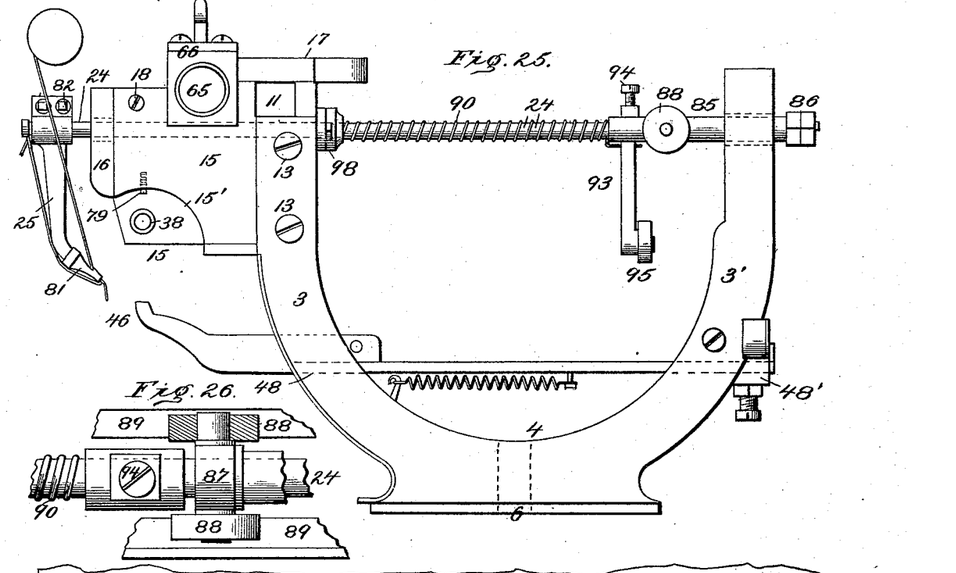
Fig. 25 shows the centerhead structure in elevation, the looper and the slide-rest devices therein.
Fig. 26 shows in top view the trunnion rolls on the looper-rod and their relation to the cams which give the looper-rod an inward movement.

An important advantage of the feed device as I have described it is, that it has but one wear joint and that is well protected from wear and from lost motion, and whatever wear may occur is taken up by an adjusting screw 79, Figs. 2 and 25, arranged in the arched plate of the sewing-head so as to form a stop against which the upper end b, Fig. 15, of the arm 19, which has the feed-lip, strikes to prevent the latter from being forced up above the line of movement of the needle, and the bottom of the channel while pressing the work against the feed-lip.

The fulcrum pin 80 of the bifurcated lever 70 is screwed into the top plate of the sewing head and has a bush bearing in the lever so that it can be replaced when necessary, as in Fig. 8.

I will now describe the mechanism for placing the thread in the barb of the needle and for forming the loop around it. It consists of a swinging arm 25 mounted upon the front end of a horizontal rock bar or tube 24, which passes through the sewing-head between the cam-cylinders and through the rear pillar of the centerhead, so that it has bearings in the sewinghead and in the centerhead and within which it has both a longitudinal and a rocking movement, as I will presently state. At its front end this rod projects from the sewing-head and has the swinging looper-arm, which at its lower end, has the looper-finger 81 standing at a downward incline toward the needle, and when in its normal position is to the extreme left of the line of movement of the needle and the latter is at its extreme inward position. The upper end of the needle-arm is split and is clamped upon the said rod by screw 82, see Fig. 12. The looper-finger is cylindrical, is screwed into the arm and has a central hole 83, which opens at its side 84 to receive and feed the thread. The other end of this rock rod 24 projects beyond the centerhead and terminates in a screw stem 24', Fig. 8, on which a sleeve 85 is fitted between the jam nuts 86 on the screw stem and a trunnion 87 Fig. 26, fitted loosely upon said rod, and has friction rolls 88, which engage face cams 89 for forcing the looper inward. A spring 90 on this rod constantly tends to force the looper frontward, and the provision of the jam nuts 86 is for adjusting said rod to properly set the looper-finger in relation to the needle. In this adjustment the sleeve 85 abuts against the trunnion head 87 and as its rolls 88 constantly bear upon their respective cams 89, Figs. 6, 8, and 26, the jam-nuts therefore acting against the sleeve 85 as a fixed point, will set the looper-finger and render the rolls self adjusting on their cams under the action of the spring. A bush bearing 91 is provided at the rear side of the centerhead for this looper-rod, and there is a similar bearing 92 for its front end so that these bearings can be replaced when worn.

An arm 93 depends from the rock-rod and is clamped to it by a screw 94 while its lower end has a friction roll 95 which engages a ring cam 96 on the inner vertical face of the left cylinder 97, whereby said arm is moved positively to rock the rod and vibrate the looper-arm to the right. The spring 90 has a fixed connection with the rock-rod or its roll-arm, its other end being connected into a threaded box 98, Figs. 8 and 30, and clamped to the inner end of the sewing-head and its torsional force causes the looper-arm to vibrate to the left.

The screw of the box engages the coils of the spring and holds it against the direct force and torsional strain caused by the longitudinal and rocking movements of the looper-rod and prevents the spring from having friction contact with said rod, so that the conjoint action of the trunnion-head cams 89, the roll-arm cam 96, and the rod-spring 90, gives the required revolving motion to the looper-finger.

The provision for adjusting the looper-rod serves also for adjusting the roll-arm 93 so that it will not come in contact with the crank connected end of the pitman-rod. When the adjusting nuts 86 are turned to the left the spring sets the rock-rod and its looper-arm forward and when these nuts are turned to the right the rock-rod and its looper-arm are moved back. This construction and the action of the spring renders the trunnion-rolls self adjusting in the line of the rod and upon their cams, and takes up any wear that may occur in the longitudinal movements of the looper-rod 24 or the side movements of the roll-arm 93. An important feature of this looper-rod and its coiled spring is the capacity of the looper-arm to yield while moving to the left, so that at any point in its movement to the left the looper is free to yield to avoid breaking the needle or bending the same by coming in contact therewith, which would be liable to occur should the needle pierce the sole low down and beyond the channel. In such event the yielding function of the looper-arm sidewise is permitted by the tension of the spring 90 and the latter thereby forms a cushion for the looper-arm and permits it to be arrested and to yield in the contingency stated.

The provision which I have described for adjusting the looper-rod, is important to keep the looper-finger in position to describe the circle of which the needle will always be the center, because the tendency of the wear is to allow the looper-rod to work forward under the force of the spring, which without being compensated for would in time cause the looper-finger to strike the needle.

Figure 6:
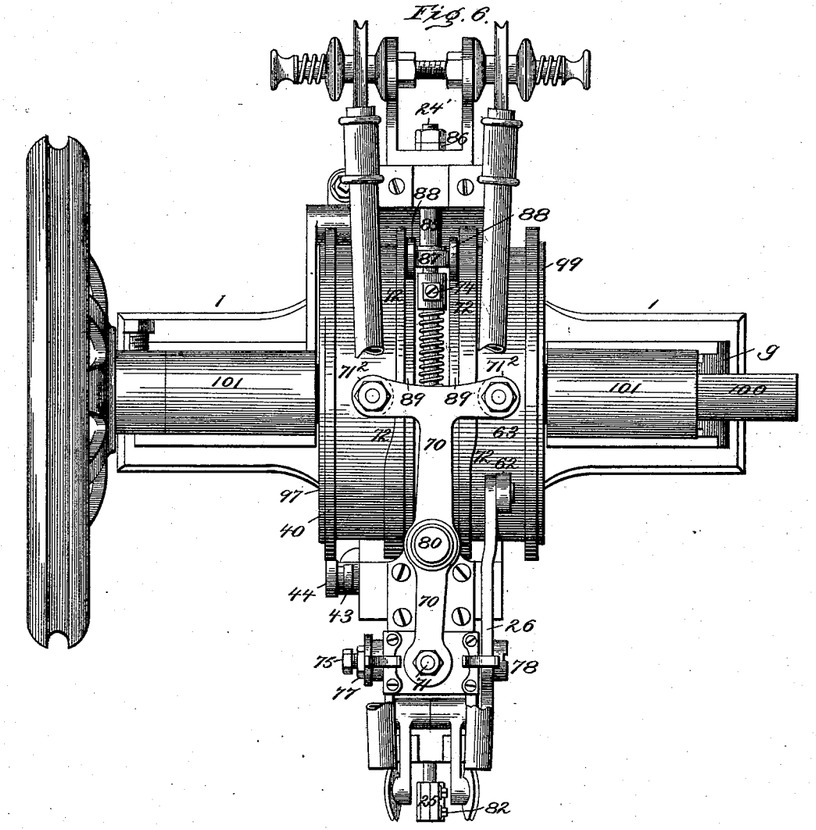
Fig. 6 is a top view of the same.
Figure 7:
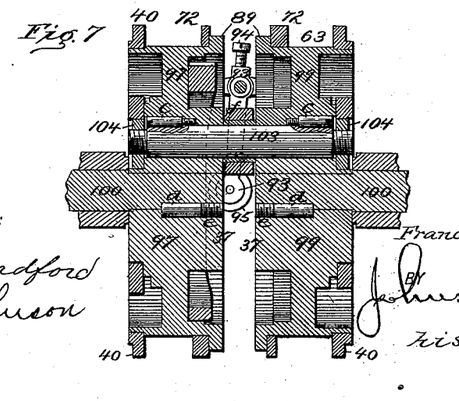
Fig. 7 is an axial section of the separate cam cylinders and showing their connection by the pitman-rod operating crank-pin for the needle carrier.

Referring to the cam actuated rolls 88 on the rock-rod for giving the looper its rearward movements, I fit these rolls loosely on the trunnions of the cross-head and hold them in place by shoulders formed by the cams 72 see Figs. 6 and 7 on the cam cylinders. This allows the rolls to be removed for replacement by new ones by pushing the rock-rod back to clear the rolls of the cam shoulders.

As stated the needle-carrier is operated by a direct crank motion wherein the crank is mounted in separate cam-cylinders. These cam-cylinders 97 and 99, Fig. 7, are each fixed upon a separate shaft 100, which are mounted in separate standards 101 on the base-plate of the centerhead. The cam-cylinders are separated to permit of the rotary crank movement of the pitman-rod between them, and for access to the cams and mechanism when necessary. The separate cam-cylinders each have a ring-cam, on its outer side and on its circumference and the left of said cylinders 97 has an inner side face-cam as I will presently describe. These cylinders are united to each other by the crank-pin 103 of the pitman-rod, which pin has a screw thread on each end to receive countersunk nuts 104 on the outer sides of said cam-cylinders. The crank-pin is also keyed to the cylinders by means of screw pins $c$ $c$; while the cam-cylinders are keyed to their respective shafts by means of key pins $d$ $d$ and screws $e$ $e$, which serve to hold the cam-cylinders fast on their respective shafts so that they can neither turn on nor slide off their shafts. A sleeve $f$ on this crank-pin forms a bush-bearing for the pitman-rod and the sleeve ends abut against the inner hubbed sides 37 of said cylinders and thus prevent the sleeve from turning and avoid any binding action on the pitman-rod. The nuts 104 bind the cam-cylinders firmly against the bush-bearing $f$ and this bearing, the crank-pin and the cam-cylinders are united and rotate together with their separate supporting shafts, one of which has the belt-wheel. The separate shaft standards are fitted in recessed ways $g$, Figs. 2, 5, and 6 on the base-plate and are secured and made adjustable by clamp-screws $h$ Fig. 5, so as to bring the cam-cylinders in equal relation to the opposite sides of the centerhead. In connection with this lateral adjustment of the cam-cylinders I provide for adjusting the centerhead at right angles to the line of the shafts by the slot 9 in the base-plate, and the screw bolt 8, Fig. 1 which secures the centerhead thereto. The object of this adjustment is to set the centerhead so that the needle shall have the proper relation to the looper, and in connection with the side adjustment of the cam-cylinders, give all the working parts a perfect central relation to each other.

Having described the construction and functions of the several operating devices in the organized machine I will now describe the means by which these devices are separately and conjointly operated.

As the needle-carrier is operated by its pitman-rod connection to move the needle forward, the back-gage is at the same time moved forward a little in advance of the needle in position to press the edge of the shoe upper against the shoulder of the sole to hold them together while pulling the stitches. This movement of the back-gage is effected by a circumferential ring-cam 40, Fig. 3, which has a flattened surface $i$ of about one-fifth of the circumference so that while this flattened part serves where it merges into the circumference of the ring, to cause the back-gage to be moved in and out at the proper time, the concentric part 40 of said cam acts to lock and to hold the roll-arm 43 and its connected back-gage 39 in its supporting position while the stitch is being pulled in tightly. The important feature of this lock and its release is that it is made by a single ring-cam actuating a rock-arm. I also make this cam 40 to gradually merge into the true circle at $i^2$ $i^2$ to cause it to give a gradual forward movement to the back-gage just before it comes in contact with the work and thus prevent all knocking action which would result from a sudden outward spring throw of the said gage and jar the shoe forward so that the feeding-lip would be liable to cut through the bottom of the channel and destroy the sole.

Referring to Figs. 1 and 8, the back-gage, the needle, the slide-rest and the looper are shown at the limit of their outward movements, the slide-rest having been so moved by the spring 60 attached to the center-head and to the inner end of the slide-rest, so as to constantly tend to move the latter forward to keep the shoe firmly pressed against the feed device. When in this position the slide-rest is locked by the ring-cam 57 on the outer side of the left cam-cylinder 97 which cam for about half its circumference is constructed at its lowest part $j$ Fig. 3, to allow the pressure-lever 50 to apply and maintain the lock as stated, while a stitch is being drawn tight. The other half of this cam has a greater concentric radius 57 to act upon and depress the roll-end of the lever to raise and release the pressure-lever from the friction block 49 and thus allow the free yielding action of the slide-rest to admit of the free feeding of the shoe between it and the feeding lever.

The lever of the feed device has its compound movement effected as follows: The circumference of the right cylinder 99 has a slight depression $k$, Fig. 14, of about one-fifth of the same, which gives the in and out movements to the acting end 19 of the feed-lever 26, while the remaining portion of this cam circumference 63 serves to hold the feed lever-lip $a$ against the bottom of the channel in the sole. A vertical face ring cam 72 on each cylinder operates to vibrate the T-shaped lever 70 to move the feed-lever 26 sidewise to feed the shoe by the saw-tooth shaped movement of the acting end of the feed-lever, which I have described. The cam 72 which gives the movement to feed the shoe, is on the right side of the cylinder 99 and has a curved surface projection 72, Figs. 6 and 27, about one-seventh of the circumference of the cam and acts to move the feed-lever the extent of the feed; while the cam 72 on the left side cylinder 97 is of identical construction and acts to move the feed-lever the distance to make the next feed of the shoe. It will be understood that as the feed-lever 26 is vibrated sidewise its friction roll 62 slides on the surface of the cam 63 on an oblique path.

I have planned all of the cam movements so as not to exceed three-eighths of an inch throw, which makes the machine easy running and almost noiseless, not so liable to get out of order, with comparatively little wear and having quick movements. I make these cams on rings to be easily seated, removed and replaced by new ones; while the cylinders on which they are seated are arranged in the open arch-way space of the centerhead so as to receive between them the crank operated pitman, the looper carrying rod, and the slide-rest.

It is important to notice that the locking and releasing action of both the back-gage and the slide-rest, are effected by independent means, and this gives the advantage of maintaining the lock of the back-gage a longer time than that of the slide-rest for the purpose of keeping the shoe in its place until it is fed for the next stitch; whereas if both these devices were released at the same time the operator would have to guard against the displacement of the shoe from the feed-lip. For this purpose the slide-rest is locked at a point traversed by one-half the revolution of its operating cam; while the back-gage is locked at a point about three-quarters of the revolution of its operating cam. It is also important to notice that the organization of the machine is such as to dispose the crank operated pitman-rod, the back-gage, the slide-rest, and the looper operated rod, in a vertical plane in the center-head, and thereby gives a compact relation of the parts and the advantage of operating the several devices in a direct longitudinal line in the structure, and the operator has thereby a free and clear front for swinging the shoe while sewing the shanks.

The provisions which I have described for moving the looper-arm in and out are such as to cause its thread carrying finger to describe a half circle while moving outward and then a half circle while moving inward to complete its rotation around the needle to place the thread in its barb and this division of such movement in connection with its sidewise movement to form the loop is very advantageous in preventing misthreading the barb of the needle.

The compound movements of the looper for describing a circular path to place the thread in the needle-barb in the formation of the loop, is effected as follows: The rod 24 which carries the looper 81 and the roll-arm 93 has a reciprocating and rocking movement, each effected simultaneously by the following mechanism: The reciprocating movement is effected by the circumferential cams 89, and the spring 90, the rocking movement of said looper rod is effected by the face cam 96.

Figure 23:
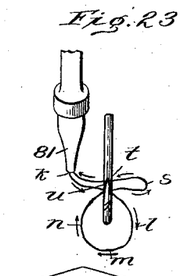
Fig. 23 illustrates the operation of the looper around the needle to form the loop and place the thread in the barb.
Figures 27, 28:
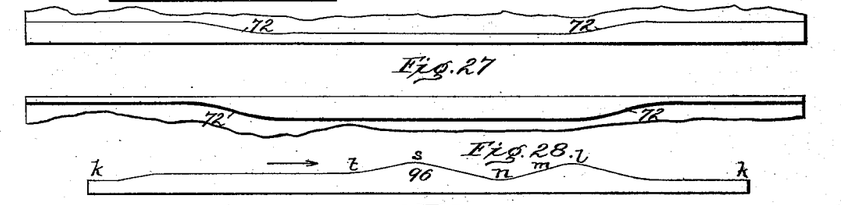
Fig. 27 shows circumferential cams for the top feed lever developed in profile.
Fig. 28 shows the face cam, developed in profile, for operating the looper and roll arm.
Figures 29, 30:
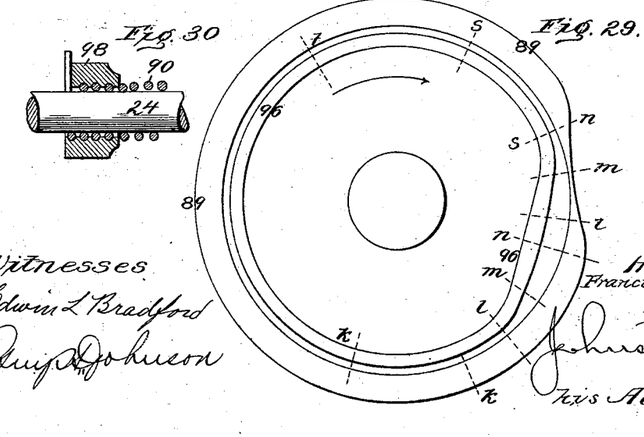
Fig. 29 shows the cams for operating the looper.
Fig. 30 shows the screw-box for fastening the looper rod spring to the sewing head, as seen in Figs. 1 and 8.

Referring to Figs. 23, 28, and 29 which illustrate the looping circle formed around the needle, and the cams for effecting the same and assuming the looper-finger 81 to be at the starting point $k$ Fig. 23 which is its starting point in relation to the needle, the looper will be caused to describe a quarter circle from $k$ to $l$ by means of the cam 96 moving the roll arm 93 sidewise and by the action of the spring 90, moving the looper forward. From this point $l$ the looper continues to move to the front of the needle from $l$ to $m$ by the action of said spring and continues moving from $m$ to $n$ by the action of said spring and cams 89 and so on from $n$ to $s$ by the action of the cams 89 and cam 96, which completes the c'rcle with respect to the needle and places the thread in its barb $u$. The course of the looper is now changed from $s$ to $t$ which latter letter is in line with the needle, and the looper remains in this position until the needle reaches its extreme backward movement. At this point the slide-rest is unlocked and the back-gage is being drawn inward. The feed-device now starts to feed the shoe and at the same instant the looper starts with the feed and traverses from $t$ to $k$, which completes the operation of the looping mechanism.

The path of the looper above described with reference to Fig. 23 can be read with the same letters of reference in Figs. 28 and 29 in relation to the roll-arm 93.

It will be understood that in these compound movements of the looper-rod, the spring 90 gives the looping device the forward movement to carry the looper outward, while the cams 89 act on the trunnion-rolls to draw it back positively. The roll-arm 93 is actuated by the same spring at the same time by torsion to rock the rod and move the looper to the left; while the cam 96 serves to rock the rod and move the roll-arm and looper positively to the right. This construction it will be seen provides for actuating the looper in two directions by one spring, and a simple arrangement of cams upon separate cylinders for actuating the looper in two other directions, giving it an easy movement, provides for its wear and is practically composed of a compact device carried by a single rod.

The placing of the thread in the barb $u$ of the needle moving inward and while the looper is at the same time moving from the point $n$ to $s$ prevents mislooping of the thread by reason of the joint action of two movements of the looper and needle at the same time, the former from the left to the right and the needle inward. The object of having the looper move to the left at the same instant the feed device is moving to the left is to prevent the feed device from dragging or straining the thread as it is carried by the looper and to permit of a free and easy feed, because these two movements bring the devices together at the point to make the feed at the same time and work together and with a uniform drawing action on the thread. The arm 19 that carries the channel-lip is made adjustable vertically by means of slots and bolts seen in Figs. 12 and 13; the looper-arm can be adjusted upon its rock rod, by its split end and clamp-screws, the back-gage can be adjusted by its operating arm 43 and the needle can be set in proper relation to the looper, so that these parts are quickly and easily set in working relation.

The tension device which I have shown is adapted for two separate and distinct threads for independent use with a looper and a needle and the drawings illustrate the relation of these two threads with the looper which carries both in its looping-finger, but with one of such threads always hung up out of use. In sewing shoes of light and heavy stock it is the practice to change the thread to suit the different work, and to do this the thread must be cut at a point outside of the wax pot in order to join it with a lighter or with a heavier thread as may be required for the work. In doing this the cut off part of the thread is tied to the end of the new thread and the latter is drawn through the machine and the cut off part of the thread is thrown away. The time of the operator is lost in passing the new thread into the machine and adjusting the tension to suit the work. To save all this trouble, loss of time and inconvenience, I provide the machine with tension devices for two separate and different threads suited for light and for heavy stock. For this purpose I use a tension device for each thread which is delivered to the looper-arm, in the finger whereof they are held for separate and independent use. The end of that thread which is not in use is held out of the way at the upper end of the looper-arm as seen in Fig. 12.

The waxing and heating appliance is shown attached to the rear side of the centerhead and is adapted for waxing and heating two separate and independent threads. As to these appliances and the tension devices, they may be of any suitable construction.

The machine is adapted for sewing turned or welted work and operates with a curved needle which has a reciprocating or partial rotation to and fro around an axis, and is formed with a barb on the side in the direction of feed into which the looper engages the thread in describing a circle around the needle.

It will be understood that a work table is placed around the stand below the sewing-head, and as the wax-pot and tension device are mounted upon the swiveling member of the stand, such swiveling capacity affords access to these devices, which can thereby be brought around to the front of the table.

It is evident that immaterial changes may be permitted from the general construction and arrangement of parts contributing toward my invention, and for this reason I do not wish to be understood as limiting myself in precise detail and construction. It will also be understood that many of the details above described are not essential to the several features of my invention separately considered. This will be indicated in the concluding claims, as in any given claim the omission of an element or the omission of reference to the particular features of the elements mentioned, is intended to be a formal declaration of the fact that the omitted element or features are not essential to the invention covered therein.

I have illustrated in the drawings the invention claimed herein in connection with a complete shoe sewing machine, but as to all matters of devices and of the combinations of such devices embraced in said machine, other than those which belong to and are covered by the invention claimed herein, they are embodied in separate and distinct applications, Serial Nos. 491,159, 491,442, 490,965, 491,443, and 490,383, for patents filed by me and are therefore not claimed herein.

Having described a machine for sewing shoes, embodying in preferred form the several features of my present invention in work supporting and feeding devices in combination, what I separately claim, and desire to secure by Letters Patent, is—

1. In a shoe sewing machine, the combination with a needle, of a lipped-lever arranged to operate in the channel of the sole to feed the shoe, and mechanism for imparting to the lipped-end of said lever a movement at right angles to the path of the needle and an outward oblique movement away from the bottom of the sole channel, substantially as described for the purpose stated.

2. In a shoe sewing machine, a feed-device comprising a vertically rocking lever having a channel-lip, and a horizontally rocking lever for imparting a sidewise movement to said lever and channel-lip simultaneously with its vertical rocking movement, in combination with suitable operating connections for said levers, whereby the said channel-lip is caused to travel in a saw-tooth-like path.

3. In a shoe sewing machine, a channel feed-device consisting of the two levers constructed and connected substantially as herein described, in combination with cams for separately operating the connected levers simultaneously, whereby the connected lever part having the feed-lip is caused to describe a zig-zag path in relation to the bottom of the channel.

4. In a sewing machine a feed-device comprising a vertically rocking lever having a channel-lip and a horizontal swinging lever for imparting a sidewise movement to said channel-lip, simultaneously with its vertical movement, a cam and a spring for operating said vertically rocking lever, and cams for imparting sidewise movements to said horizontal lever, for the purpose stated.

5. In a shoe sewing machine the compound feed lever device having vertically rocking and horizontal lateral movements as described, in combination with a pivot-pin having wear sleeves and axial wear-pins and connecting both levers, and suitable operating connections for said levers, substantially as described.

6. In a shoe sewing machine, a feed device comprising a vertically rocking lever having a channel-lip and mounted upon a pivot-bearing having a side hole, axial wear-pins entering said side hole and an adjusting screw terminating in one of said wear-pins, a horizontal swinging lever having a pin entering said side hole between said axial pins for imparting a lateral movement to said channel-lip simultaneously with its vertical movements, in combination with suitable operating connections for said levers, substantially as described.

7. In a shoe sewing machine a feed-device comprising a vertically rocking lever having a channel-lip, and a horizontal swinging lever for imparting a sidewise movement to said channel-lip simultaneously with its vertical movements, and having a pair of rolls, in combination with a spring and a cam for imparting to said lever its vertical rocking movements, and separate cams for operating the lever having the pair of rolls, substantially as described.

8. In a shoe sewing machine, the combination with the sewing-head, and a barbed-needle, of a feed-device having its bearing-pivot provided with wear-sleeves, mechanism for imparting to said feed-device a vertically rocking and a laterally reciprocating movement, and an adjustable stop 79 arranged to limit the upward movement of the feed-lever while the needle is about to enter the shoulder of the sole.

9. In a sewing machine, a feed-device comprising a vertically rocking lever having a feed-lip at one end, a roll at its other end and a fulcrum-pivot-pin between these points, and a horizontal lever loosely engaging said fulcrum-pin and having a pair of rolls at its other end, cams for operating said levers, said cams being so timed that the said first named lever has vertical and sidewise simultaneous movements imparted to it describing a triangular path.

10. In a shoe sewing machine, the combination with a feed-device, of a back-gage, an arm 43 connected therewith, a spring 45 connected to move said gage rearward, and a cam 40 adapted to move said back gage outward toward the needle and to lock and hold it in position for supporting the work while the stitch is being tightly drawn, substantially as described.

11. In a shoe sewing machine, the combination with the needle, a feed-device, and the back-gage, of a device for operating said gage consisting of the arm 41, a rock-pin 42, the adjustable arm 43 upon the latter having the roll 44, a cam 40 constructed to move said gage outward and to lock it, a spring for retracting said gage, substantially as described.

12. In a shoe sewing machine, the combination with a slide-rest, of a locking device therefor consisting of a friction-block 49, seated upon said slide, a lever 50 seated upon said friction-block, a spring 51 upon the free end of said lever, a lever 54 having a screw abutting against the free end of the lever 50 and the cam 57 for operating the said levers, substantially as described.

13. In a shoe sewing machine, the combination of a slide-rest and its projecting spring, with a locking device for said slide-rest, consisting of the friction block 49, the lever 50 arranged on the rear side of the centerhead and crossing upon said friction block, and the lever 54 arranged on the side of the centerhead, an adjusting screw 58 in the end of said lever 54 supporting the end of said lever 50, a spring 51 upon the end of the latter lever, and a cam 57 for releasing the pressure of said spring, substantially as described.

14. In a shoe sewing machine, the combination with a slide-rest, of a guide-box therefor, a friction-block seated in said guide-box and having a cross-groove in its upper side, a pressure-lever seated in said block-groove, a lever at right angles to said pressure-lever, an adjustable bearing connecting the meeting ends of said levers, a spring bearing upon the connected ends of said levers, and a cam for lifting said levers at their meeting ends for the purpose stated.

15. In a shoe sewing machine, the back-gage and the slide-rest, combined with an independent locking-cam for each so timed as to maintain the lock of the back-gage a longer time than the lock for the slide-rest, for the purpose stated.

16. In a shoe sewing machine, the combination of the two feed levers, the one 26, being L-shaped and having the channel-lip and the sliding bearing pin 74 thereof having the circumferential recess, the other lever 70 having the pin 71 engaging said recess, and the pair of rolls $71^2$, the cam 63, and the pair of cams 72 for operating the feed-lip in the way and for the purpose stated.

17. In a sewing machine, a feed-device comprising a bellcrank lever having a feed-lip on one end and a roll on its other end and a pivot bearing at the angle of said lever having a circumferential mortise and a lever engaging said mortise, in combination with cams for vibrating said latter lever horizontally, the said bell crank lever by its mortised connection and an operating cam, being caused to have simultaneously a movement in each of two directions thereby moving the feed lip in a triangular path in the way and for the purpose described.

18. In a shoe sewing machine, the combination of a back-gage, its retracting spring 45 and the arm 43 for effecting its forward movement, with a cam 40 constructed with the depressed face parts $i$ $i^2$ $i^2$ and arranged to maintain a contact with said arm whereby to give the back-gage a quick and slow movement in the way and for the purpose stated.

19. The combination with a curved barbed-needle, of a feed-device consisting of a vertically rocking bell-crank lever having a channel-lip at one end, a horizontal face cam for operating its other end, and a horizontal rocking lever connected with the horizontal pivot bearing of said vertically rocking lever, and a pair of vertical face cams for vibrating the other end of said horizontal rocking lever, whereby the vertically rocking lever is caused to have simultaneously a movement in each of two directions, thus imparting to the channel-lip a movement in a triangular path in the way and for the purpose stated.

In testimony whereof I have hereunto signed this specification in the presence of witnesses.

FRANCIS ARTHUR MILLS.

Witnesses:
A. E. H. JOHNSON,
PHILIP F. LARNER.